United States Patent
Wu et al.

(10) Patent No.: US 11,956,211 B2
(45) Date of Patent: Apr. 9, 2024

(54) SYSTEMS AND METHODS FOR INTERNAL SECURE NETWORK RESOLUTION

(71) Applicant: Fortinet, Inc., Sunnyvale, CA (US)

(72) Inventors: Weining Wu, Burnaby (CA); Kunal Marwah, Burnaby (CA); Jinhai Yang, Burnaby (CA); Xu Zheng, Burnaby (CA)

(73) Assignee: Fortinet, Inc., Sunnyvale, CA (US)

( * ) Notice: Subject to any disclaimer, the term of this patent is extended or adjusted under 35 U.S.C. 154(b) by 248 days.

(21) Appl. No.: 17/463,787

(22) Filed: Sep. 1, 2021

(65) Prior Publication Data
US 2023/0060895 A1    Mar. 2, 2023

(51) Int. Cl.
  *H04L 41/0233*   (2022.01)
  *G06F 21/71*     (2013.01)
  *H04L 9/40*      (2022.01)
  *H04L 41/12*     (2022.01)
  *H04L 41/0226*   (2022.01)

(52) U.S. Cl.
  CPC .......... *H04L 63/0236* (2013.01); *H04L 41/12* (2013.01); *H04L 63/0876* (2013.01); *H04L 63/20* (2013.01)

(58) Field of Classification Search
  None
  See application file for complete search history.

(56) References Cited

U.S. PATENT DOCUMENTS

| | | | |
|---|---|---|---|
| 6,118,768 A * | 9/2000 | Bhatia ............... | H04Q 11/0471 370/254 |
| 7,725,921 B2 * | 5/2010 | Trutner ............... | H04L 63/0227 726/1 |
| 2016/0197898 A1 * | 7/2016 | Hozza ................ | H04L 61/4511 713/168 |
| 2017/0279846 A1 * | 9/2017 | Osterweil .......... | H04L 63/1425 |
| 2018/0167361 A1 * | 6/2018 | Xiao .................. | H04L 63/1458 |
| 2018/0205734 A1 * | 7/2018 | Wing .................... | H04L 63/20 |
| 2020/0252374 A1 * | 8/2020 | Bosch ................ | H04L 61/5007 |
| 2020/0351244 A1 * | 11/2020 | Moore .................... | H04L 63/20 |
| 2022/0353293 A1 * | 11/2022 | Buck .................. | H04L 61/4511 |
| 2023/0049547 A1 * | 2/2023 | Glazemakers ........ | H04L 61/256 |

OTHER PUBLICATIONS

VPN Traffic Detection in SSL-Protected Channel. Abideen. Wiley. (Year: 2019).*
Implementing DMZ in Improving Network Security of Web Testing in STMIK AKBA. Iskandar. SPC. (Year: 2018).*
On the Usability of Firewall Configuration. Wong. (Year: 2008).*

* cited by examiner

Primary Examiner — Venkat Perungavoor
(74) Attorney, Agent, or Firm — Jaffery Watson Mendonsa & Hamilton LLP

(57) ABSTRACT

Systems, devices, and methods are discussed for limiting exposure of internal network operations beyond the boundary of a secure network.

12 Claims, 6 Drawing Sheets

SYSTEMS AND METHODS FOR INTERNAL SECURE NETWORK RESOLUTION

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2021, Fortinet, Inc.

FIELD

Embodiments discussed generally relate to securing network environments, and more particularly to systems and methods for limiting exposure of internal network operations beyond a secure network.

BACKGROUND

Significant efforts have and are being made to secure networks, however, in traditional communication networks considerable ability to attack the network remains. Some of this ability to attack a seemingly secure network is derived from internal operations of the secured network that may be visible beyond the secured network. This information about the internal operations of the secured network can be leveraged by malicious entities to identify access points that can be subjected to attacks.

Thus, there exists a need in the art for more advanced approaches, devices and systems for facilitating internal operations of a network while reducing information about those internal operations that is visible beyond the boundary of the secured network.

SUMMARY

Various embodiments provide systems and methods for limiting exposure of internal network operations beyond the boundary of a secure network.

This summary provides only a general outline of some embodiments. Many other objects, features, advantages and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

DETAILED DESCRIPTION

Figure 1A:
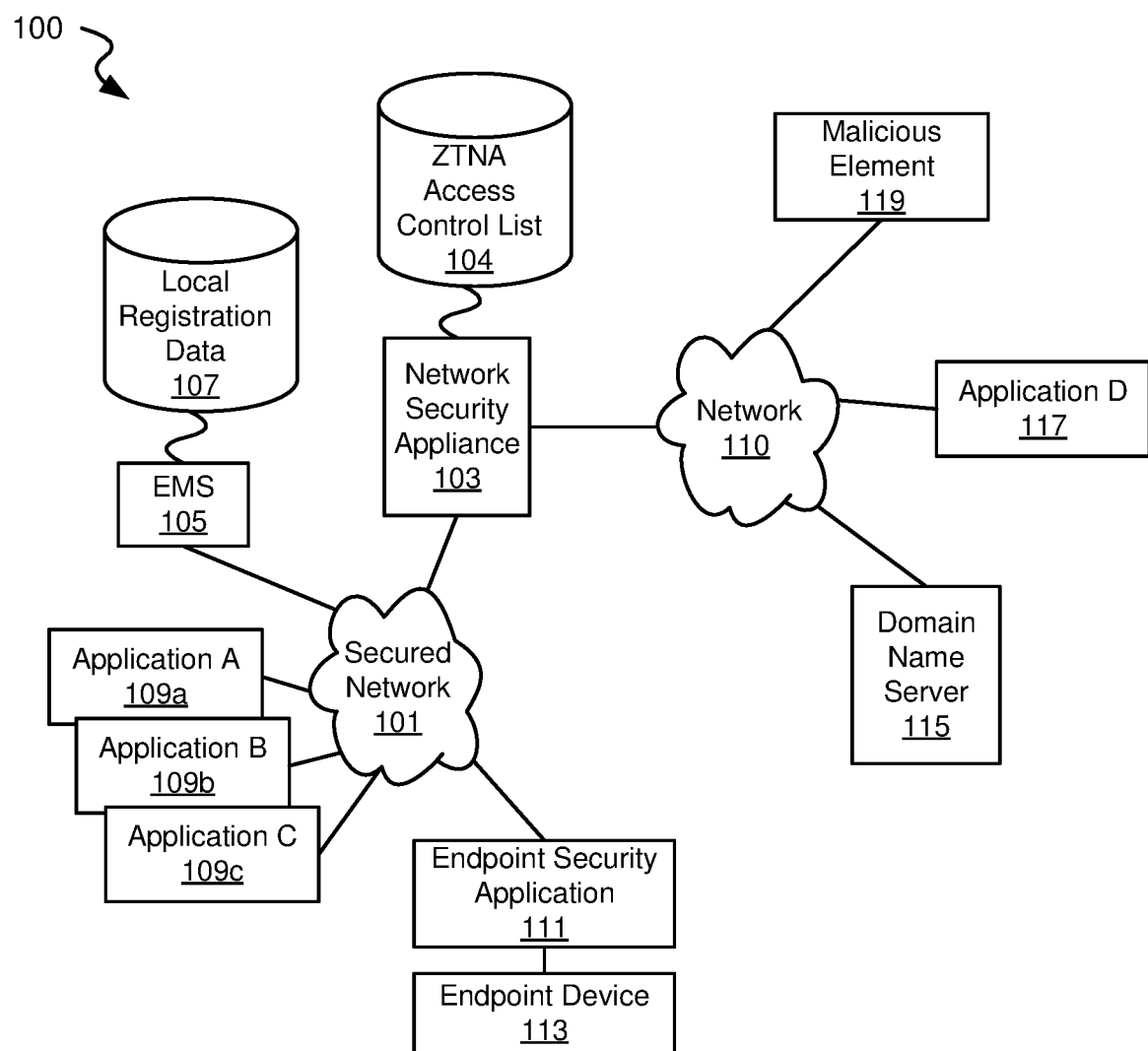
FIGS. 1A-1D illustrate a secured network including one or more endpoint security applications configured to reduce network traffic moving beyond the boundary of the secured network.

Various embodiments provide systems and methods for limiting exposure of internal network operations beyond the boundary of a secure network.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance" or a "network device" generally refers to a device or appliance in virtual or physical form that is operable to perform one or more network functions. In some cases, a network appliance may be a database, a network server, or the like. Some network devices may be implemented as general-purpose computers or servers with appropriate software operable to perform the one or more network functions. Other network devices may also include custom hardware (e.g., one or more custom Application-Specific Integrated Circuits (ASICs)). Based upon the disclosure provided herein, one of ordinary skill in the art will recognize a variety of network appliances that may be used in relation to different embodiments. In some cases, a network appliance may be a "network security appliance" or a network security device" that may reside within the particular network that it is protecting or network security may be provided as a service with the network security device residing in the cloud. For example, while there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name System (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DoS attack detection and mitigation appliances).

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

As used herein, the phrase "network resources" is used in its broadest sense to mean any resource accessible within a network that is associated with one or more Internet Protocol (IP) addresses. Based upon the disclosure provided herein, one of ordinary skill in the art will recognize a variety of network resources that may be used in relation to different embodiments.

Example embodiments will now be described more fully hereinafter with reference to the accompanying drawings, in which exemplary embodiments are shown. This disclosure may, however, be embodied in many different forms and should not be construed as limited to the embodiments set forth herein. It will be appreciated by those of ordinary skill in the art that the diagrams, schematics, illustrations, and the like represent conceptual views or processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Some embodiments provide methods for reducing internal network information available outside of a secured network. Such methods include: receiving a request for a requested network resource, where the request for the network resource includes a domain name corresponding to the requested network resource; accessing an internal list of domain names, where the internal list of domain names includes at least one domain name and a corresponding internet protocol address used to access a network resource identified by the domain name, and where the network resource identified by the domain name is accessible within the secured network; determining that the requested network resource is included in the internal list of domain names; and based at least in part on determining that the requested network resource is included in the internal list of domain names, providing an internet protocol address from the internal list of domain names in response to the request for the requested network resource without accessing a domain name system external to the secured network. In various instances of the aforementioned embodiments, the methods further include receiving the internal list of domain names from a network resource within the secured network.

In some instances of the aforementioned embodiments, the request is received from an endpoint device, and providing the internet protocol address from the internal list of domain names includes providing the internet protocol address from the internal list of domain names for use by the endpoint device. In some cases, providing the internet protocol address from the internal list of domain names for use by the endpoint device includes providing the internet protocol address in a message format used by a domain name system external to the secured network.

In various instances of the aforementioned embodiments where the request is a first request, the requested network resource is a first requested resource, and the domain name is a first domain name, the method further includes: receiving a second request for a second requested network resource, where the second request for the second network resource includes a second domain name corresponding to the second requested network resource; determining that the second requested network resource is absent from the internal list of domain names; and based at least in part on determining that the second requested network resource is absent from the internal list of domain names, forwarding a domain name server request for the second domain name to domain server outside of the secured network. In some cases, the methods further include receiving an internet protocol address corresponding to the second domain name from the domain server. In some such cases, the methods further include providing the internet protocol address corresponding to the second domain name received from the domain server.

Other embodiments provide systems for reducing internal network information available outside of a secured network. Such systems include a processing resource and a non-transitory computer-readable medium. The non-transitory computer-readable medium is coupled to the processing resource and has stored therein instructions that when executed by the processing resource cause the processing resource to: receive a request for a requested network resource, where the request for the network resource includes a domain name corresponding to the requested network resource; access an internal list of domain names, where the internal list of domain names includes at least one domain name and a corresponding internet protocol address used to access a network resource identified by the domain name, and where the network resource identified by the domain name is accessible within the secured network; determine that the requested network resource is included in the internal list of domain names; and based at least in part on determining that the requested network resource is included in the internal list of domain names, provide an internet protocol address from the internal list of domain names in response to the request for the requested network resource without accessing a domain name system external to the secured network.

Yet other embodiments provide non-transitory computer-readable storage media embodying a set of instructions, which when executed by a processing resource, causes the processing resource to: receive a request for a requested network resource, where the request for the network resource includes a domain name corresponding to the requested network resource; access an internal list of domain names, where the internal list of domain names includes at least one domain name and a corresponding internet protocol address used to access a network resource identified by the domain name, and where the network resource identified by the domain name is accessible within the secured network; determine that the requested network resource is included in the internal list of domain names; and based at least in part on determining that the requested network resource is included in the internal list of domain names, provide an internet protocol address from the internal list of domain names in response to the request for the requested network resource without accessing a domain name system external to the secured network.

Turning to FIG. 1A, a Zero Trust Access Network Access (ZTNA) network 100 including one or more endpoint security applications 111 configured to reduce network traffic moving beyond the boundary of the secured network is shown in accordance with some embodiments. As shown, ZTNA network 100 includes a number of network resources accessible within or through a secured network 101. In this embodiment, the network resources include, a network security appliance 103, an endpoint device 113, an application A 109a, an Application B 109b, and an application C 109c, and an Element Management System (EMS) 105. Based upon the disclosure provided herein, one of ordinary skill in the art will recognize a number of network resources that may be accessible within or through secured network 101 in accordance with different embodiments.

ZTNA network 100 is communicably coupled to one or more network resources via a network 110. Such network resources beyond secured network 101 may include, but are not limited to domain name servers (e.g., domain name server 115), applications (e.g., application D 117), and/or malicious elements 119. Such malicious elements may exist to identify and exploit vulnerabilities of secured network 101.

Secured network 101 may be any type of communication network known in the art. Those skilled in the art will appreciate that, secured network 101 can be a wireless network, a wired network or a combination thereof that can be implemented as one of the various types of networks, such as an Intranet, a Local Area Network (LAN), a Wide Area Network (WAN), an Internet, and the like. Further, secured network 101 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

EMS 105 maintains a local registration database 107. EMS 105 may be any EMS system known in the art, and it is well known in the art processes and approaches for registering network resources with an EMS and how such an EMS interacts with network security appliance 103 to assure that registered and trusted network resources are recognized within the ZTNA process. Local registration database 107 is a list of network resources that are known to EMS 105, and may have been granted some level of access to secured network 101. This list of network resources may include network resources beyond the boundary of secured network 101. Based upon the disclosure provided herein, one of ordinary skill in the art will recognize a variety of EMS systems that may be used in relation to different embodiments.

Network security appliance 103 is configured to govern access to secured network 101. To do this, network security appliance 103 maintains a ZTNA access control list (block 104) that lists all network resources both inside and outside of secured network 101 that are allowed to interact with secured network 101. Such use and maintenance of a ZTNA access control list is well known in the art, and any network security appliance known in the art and/or ZTNA access control list or process known in the art may be employed in relation to one or more embodiments.

Application A 109a, application B 109b, and application C 109c are applications maintained as part of secured network 101. Such applications may, for example, provide a network accessible service via an IP address. In some cases, an application may be only accessible by devices within secured network 101, or may be accessible by devices both inside and outside of secured network 101. Based upon the disclosure provided herein, one of ordinary skill in the art will recognize a variety of applications that may be maintained in relation to secured network 101.

Endpoint device 113 may be any device known in the art that is capable of interacting with a network. As just some examples, endpoint device 113 may be a mobile phone, a laptop computer, a desktop computer, a network server, and/or a network appliance. Based upon the disclosure provided herein, one of ordinary skill in the art will recognize a variety of devices that may be used as endpoint devices in accordance with different embodiments.

Endpoint security application 111 is installed on endpoint device 113 and is configured to reduce the amount of network traffic generated by endpoint device 113 that is visible beyond the boundaries of secured network 101. In some embodiments, endpoint security application 111 is implemented as a software application having instructions executable by a processing resource of endpoint device 113 to perform the various functions of endpoint security application 111. In other embodiments, endpoint security application 111 is implemented as a device having its own processing resource and a software application having instructions executable by a processing resource of endpoint security application 111 to perform the various functions of endpoint security application 111. Endpoint device 113 is registered with EMS 105.

Figure 1B:
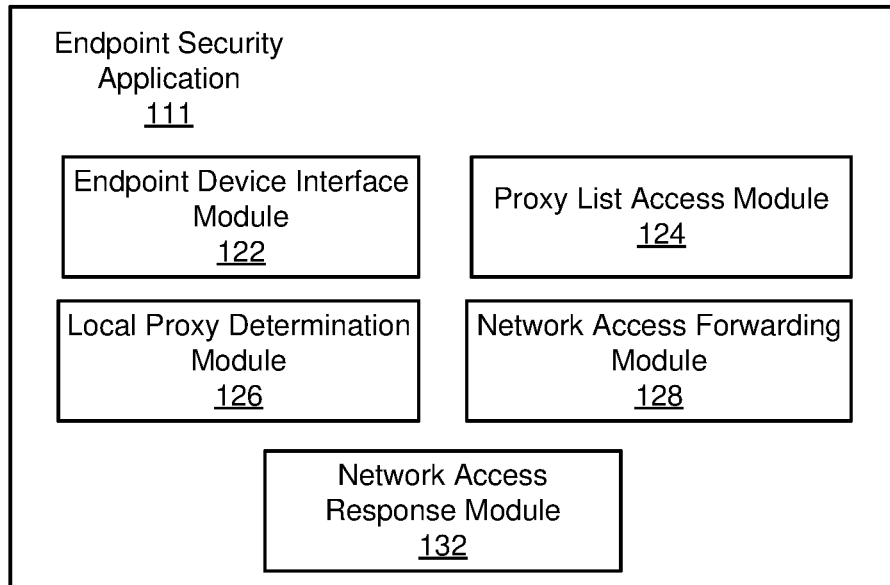

Turning to FIG. 1B, an implementation of endpoint security application 111 is shown in accordance with some embodiments. In this embodiment, endpoint security application 111 includes: an endpoint device interface module 122, a proxy list access module 124, a local proxy determination module 126, a network access forwarding module 128, and a network access response module 132.

Endpoint device interface module 122 is configured to receive network access requests from endpoint device 113. Each network access request includes a fully qualified domain name of a network resource. Endpoint device interface module 122 is further configured to return one or more IP addresses to endpoint device 113. The one or more IP addresses correspond to the fully qualified domain name of the network access request.

Proxy list access module 124 is configured to access a list of internal fully qualified domain names. In some embodiments, this list is maintained and updated by EMS 105 and is pushed to endpoint security application 111 as it is changed through an updating process. Based upon the disclosure provided herein, one of ordinary skill in the art will recognize that the list may be maintained and/or updated by network resources other than EMS 105 and/or manually by a network administrator. The list of internal fully qualified domain names includes a list of all network resources accessible within secured network 101 along with their fully qualified domain name and one or more IP addresses corresponding to the fully qualified domain name.

Local proxy determination module 126 is configured to determine whether a fully qualified domain name received as part of the network request from endpoint device 113 is on the list of internal fully qualified domain names. In some embodiments, this determination is made by comparing the received fully qualified domain name with each fully qualified domain name within the list of internal fully qualified domain names until either a match is found or until all fully qualified domain names within the list have been considered. Where local proxy determination module 126 finds the requested fully qualified domain name on the list of internal fully qualified domain names, local proxy determination module 126 forwards the fully qualified domain name along with the corresponding IP address to network access response module 132. Alternatively, where local proxy determination module 126 does not find the requested fully qualified domain name on the list of internal fully qualified domain names, local proxy determination module 126 forwards the original network access request from endpoint device 113 to network access forwarding module 128.

Network access forwarding module 128 is configured to perform a DNS request to a domain name server (e.g., domain name server 115) via network 110. The process of a DNS resolution of a fully qualified domain name to an IP address is well known in the art. Network access forwarding module 128 awaits a response from the DNS server. This response includes an IP address corresponding to the fully qualified domain name the original network access request from endpoint device 113. Once received, network access forwarding module 128 forwards the fully qualified domain name along with the corresponding IP address to network access response module 132.

Network access response module 132 is configured to format the IP address corresponding to the fully qualified domain name the original network access request from endpoint device 113 into a message which appears to endpoint device 113 as if it had been received directly from a DNS server. As such, endpoint device 113 is not aware of whether the fully qualified domain name was resolved locally by endpoint security application 111 or external to secured network 101 by a DNS server. The formatted response is provided by network access response module 132 to endpoint device interface module 122 that forwards the message to endpoint device 113.

Using endpoint security application 111 avoids transmitting DNS requests for network resources accessible within secured network 101 beyond the boundary of secured network 101 protected by network security appliance 103. As such, for example, malicious element 119 will not see the existence of a network resource where that network resource is only accessed within secured network 101, and may not become aware of an endpoint device where that endpoint device only accesses network resources within secured network 101. It follows that where information that may aid a network attack is reduced, the potential and virility of any attack on the secured network is likely reduced.

Figure 1C:
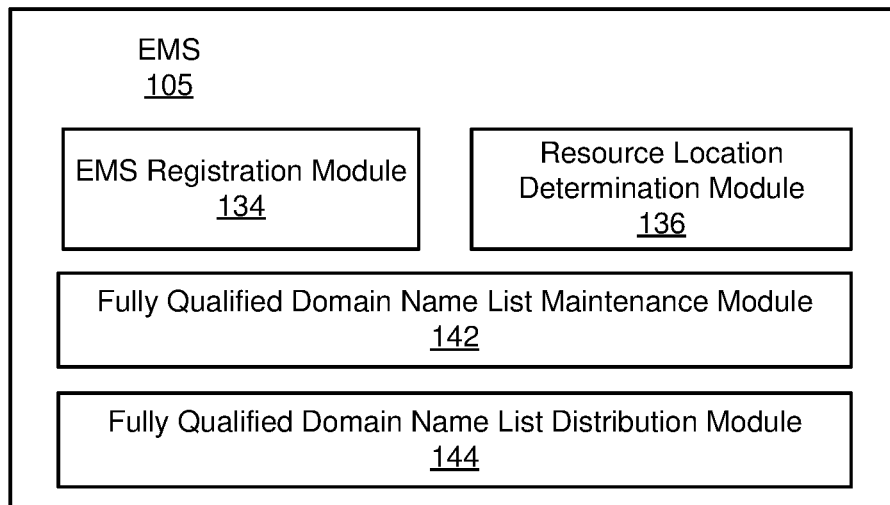

Turning to FIG. 1C, an implementation of EMS 105 is shown in accordance with some embodiments. In this embodiment, EMS 105 includes: an EMS registration module 134, a resource local determination module 136, a fully qualified domain name list maintenance module 142, and a fully qualified domain name list distribution module 144.

EMS registration module 132 EMS registration module 132 is configured to register network resources with secured network 101. Such registration includes registering network resources that are accessible within secured network 101. EMS registration is well known in the art and the registration process may be done using any process known in the art. Such registration may result in issuance of a trust certificate to the registered network resource and update in the ZTNA access control list to assure access is granted to the registered network resource. The list of registered network resources including the fully qualified domain name of the resource and the IP address of the respective network resources that are maintained in local registration data 107.

Resource location determination module 134 is configured to determine whether a network resource included in local registration data 107 is accessible within secured network 100. This may be done, for example, based upon the registration process that identifies the network resource as accessible within secured network, and includes the fully qualified domain name and IP address of the network resource.

Fully qualified domain name list maintenance module 142 is configured to include all network resources accessible internal to secured network 101 along with their fully qualified domain name and IP address in a list of internal fully qualified domain names, and to update that list whenever a network resource is added or removed from secured network 101. Fully qualified domain name list distribution module 144 is configured to provide the updated list of internal fully qualified domain names to endpoint security applications (e.g., endpoint security application 111) associated with endpoint devices (e.g., endpoint device 113) registered with EMS 105 as accessible on secured network 101.

Figure 1D:
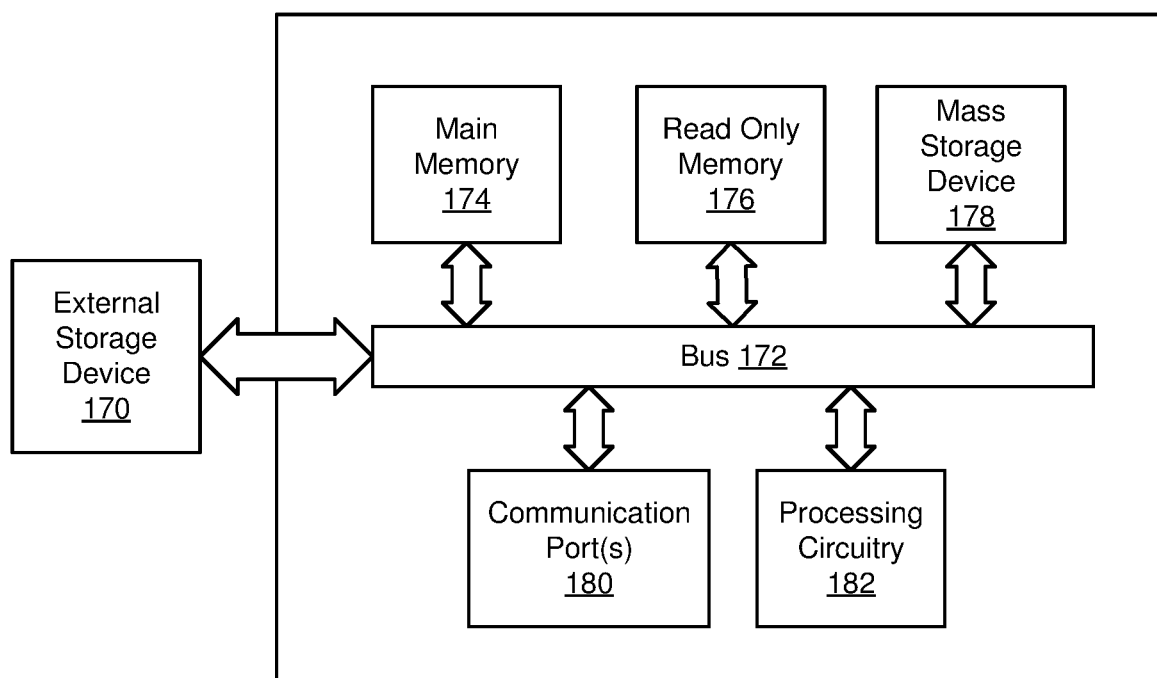

Turning to FIG. 1D, an example computer system 160 is shown in which or with which embodiments of the present disclosure may be utilized. As shown in FIG. 1D, computer system 160 includes an external storage device 170, a bus 172, a main memory 174, a read-only memory 176, a mass storage device 178, one or more communication ports 1010, and one or more processing resources (e.g., processing circuitry 182). In one embodiment, computer system 160 may represent some portion of security orchestration system 120, network security appliance 115, one or more computers on which applications A 110, application B 111, and/or application C 112 are executing, and/or one or more network servers governing database A 106, database B 107, and/or database C 108.

Those skilled in the art will appreciate that computer system 160 may include more than one processing resource 182 and communication port 180. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 182 may include various modules associated with embodiments of the present disclosure.

Communication port 180 can be any of an RS-232 port for use with a modem-based dialup connection, a 10/100 Ethernet port, a Gigabit, 10 Gigabit, 25G, 40G, and 100G port using copper or fiber, a serial port, a parallel port, or other existing or future ports. Communication port 760 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g. start-up or BIOS instructions for the processing resource.

Mass storage 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processing resources to software system.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 190 can be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM). Components described above are meant only to show various possibilities. In no way should the aforementioned example computer system limit the scope of the present disclosure.

Figure 2:
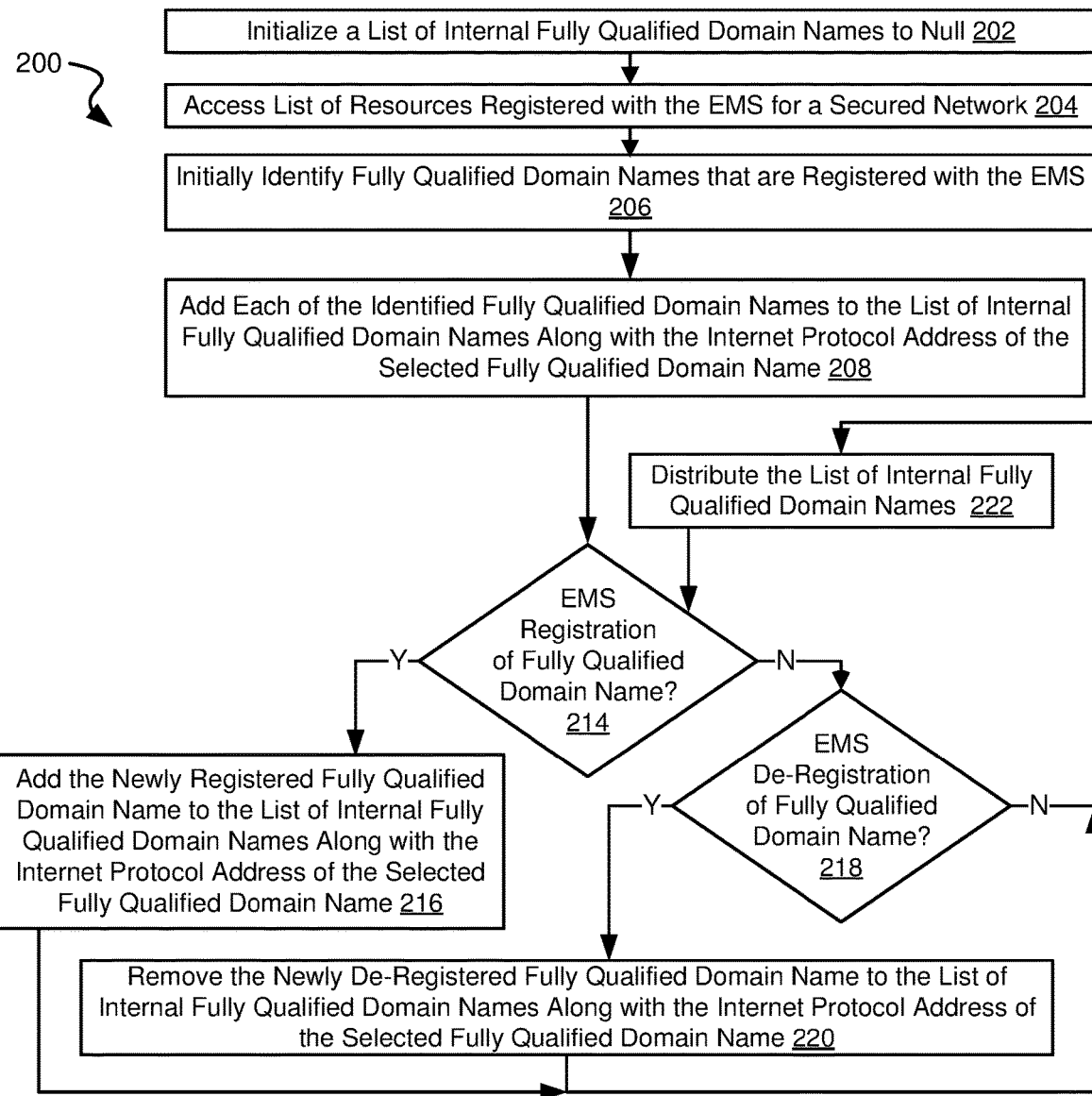
FIG. 2 is a flow diagram showing a method in accordance with various embodiments for generating and maintaining a list of fully qualified domain names of resources in a secured network based upon EMS registrations.

Turning to FIG. 2, a flow diagram 200 shows a method in accordance with various embodiments for generating and maintaining a list of fully qualified domain names maintained within a secured network. Following flow diagram 200, a list of internally fully qualified domain names is initialized as null (block 202). As more fully described in relation to FIG. 3 below, this list is used for resolving domain names without requiring activity beyond the secured network for one or more network resources available within the secured network.

A list of network resources registered with an EMS serving the secured network is accessed (block 204). As different devices and/or applications, both virtual and physical, become available on the secured network, they are registered with the EMS. When such devices and/or applications are taken offline, they are de-registered with the EMS. This registration with the EMS may be fully automated, may be fully manual where a network administrator oversees the registration, or may be some combination of automatic and manual depending upon the particular implementation. Based upon the disclosure provided herein, one of ordinary skill in the art will recognize a variety of approaches for registering with the EMS that may be used in relation to different embodiments.

Network resources registered with the EMS that include fully qualified domain names are identified (block 206). In identifying the fully qualified domain names that are registered with the EMS (block 206), the IP address corresponding to each of the respective fully qualified domain names is determined. Such determination of the IP addresses may be done using any approach known in the art. Each identified fully qualified domain name is added to the list of internal fully qualified domain names along with the IP address(es) that correspond to each of the respective domain names (block 208).

At this juncture, the initial setup of the list of internal fully qualified domain names is completed, and the list can be distributed to endpoint security applications associated with endpoint devices. EMS registrations are monitored to determine a change in network resources within the secured network that should be reflected in the list of internal fully qualified domain names. Where it is determined that the EMS has registered a resource having a fully qualified domain name (block 214), the newly registered fully qualified domain name and corresponding IP address are added to the list of internal fully qualified domain names (block 216). Similarly, where it is determined that the EMS has de-registered a resource having a fully qualified domain name (block 218), the newly de-registered fully qualified domain name and corresponding IP address are removed from the list of internal fully qualified domain names (block 220). Each time the list of internal fully qualified domain names is changed (block 216, 220), the updated list is distributed to endpoint security applications associated with endpoint devices (block 224).

Figure 3:
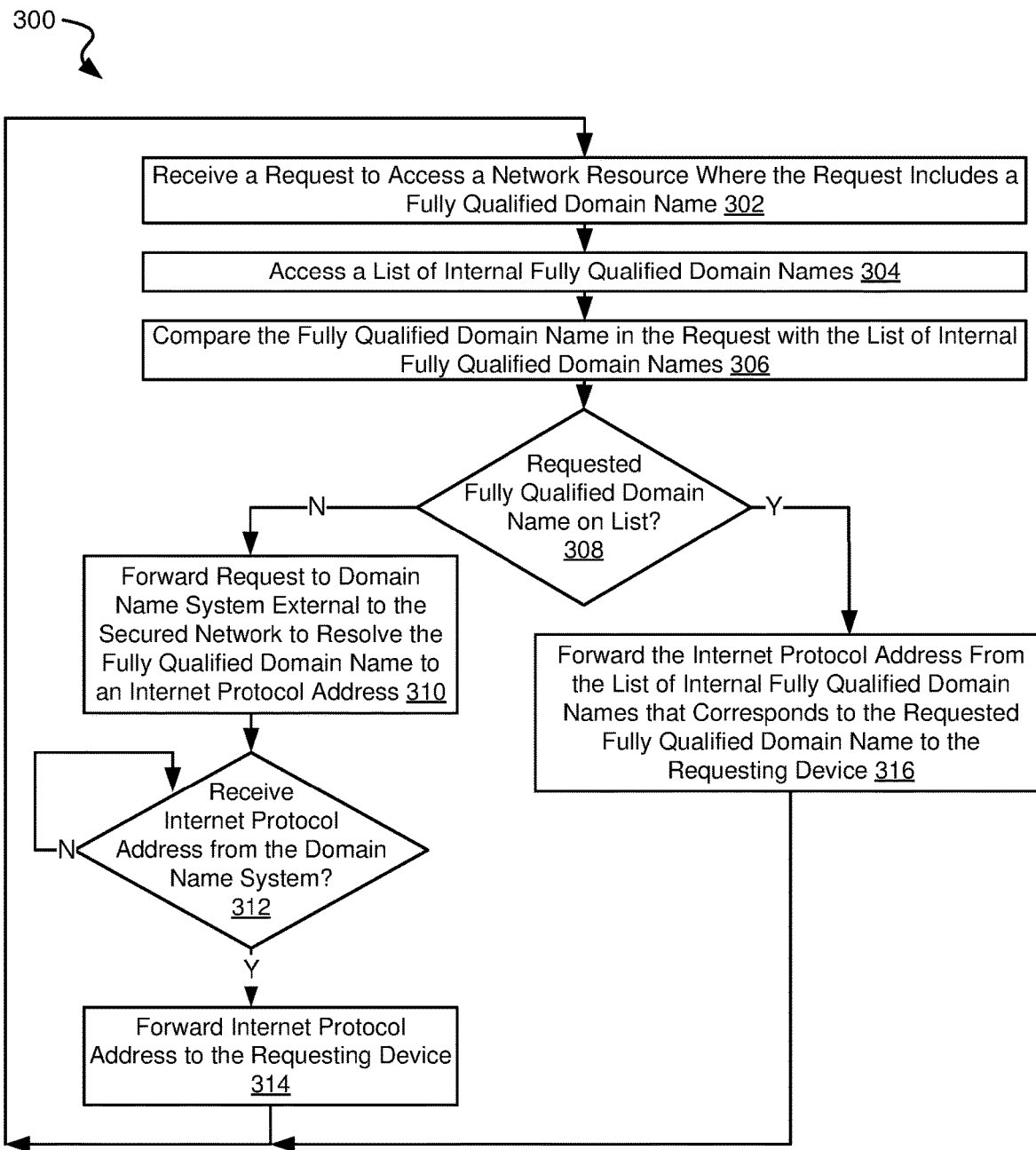
FIG. 3 is a flow diagram showing a method in accordance with various embodiments for using a list of fully qualified domain names maintained within a secured network to reduce visibility of internal network information beyond the boundaries of the secured network.

Turning to FIG. 3, a flow diagram 300 shows a method in accordance with various embodiments for using a list of fully qualified domain names maintained within a secured network to reduce visibility of internal network information beyond the boundaries of the secured network. Following flow diagram 300, a request to access a network resource is received (block 302). The request includes a fully qualified domain name that is to be accessed. A list of internal fully qualified domain names is accessed (block 304), and the fully qualified domain name received as part of the aforementioned request is compared with the list of internal fully qualified domain names (block 306).

Where the requested fully qualified domain name is found on the list of internal fully qualified domain names (block 308), the IP address corresponding to the requested fully qualified domain name is accessed from the list of internal fully qualified domain names to the device that issued the original request to access a network resource (block 316). The IP address may be provided to the requesting device in a message that appears as if the IP address was resolved and provided by a DNS server. As such, the requesting device may not be aware that the request was resolved internal to the secured network. Once received, the requesting device may use the IP address to interact with the resource associated with the IP address without initiating communications that are visible beyond the boundary of the secured network.

By resolving the fully qualified domain name and performing other interactions between the requesting device and the requested resource within the boundaries of the secured network, the amount of information about the resource identified by the requested fully qualified domain name and the endpoint device accessing the requested fully qualified domain name that is available outside of the secured network is reduced. It follows that where information that may aid a network attack is reduced, the potential and virility of any attack on the secured network is likely reduced.

Alternatively, where the requested fully qualified domain name is not found on the list of internal fully qualified domain names (block 308), the request including the fully qualified domain name is forwarded to a DNS server external to the secured network for resolution to an IP address (block 310). Such forwarding may be done consistent with any domain name resolution request approach known in the art. Reception of an IP address corresponding to the fully qualified domain name is awaited (block 312). Once received (block 312), the IP address corresponding to the fully qualified domain name is forwarded to the requesting device (block 314). Once received, the requesting device may use the IP address to interact with the resource associated with the IP address.

Figure 4:
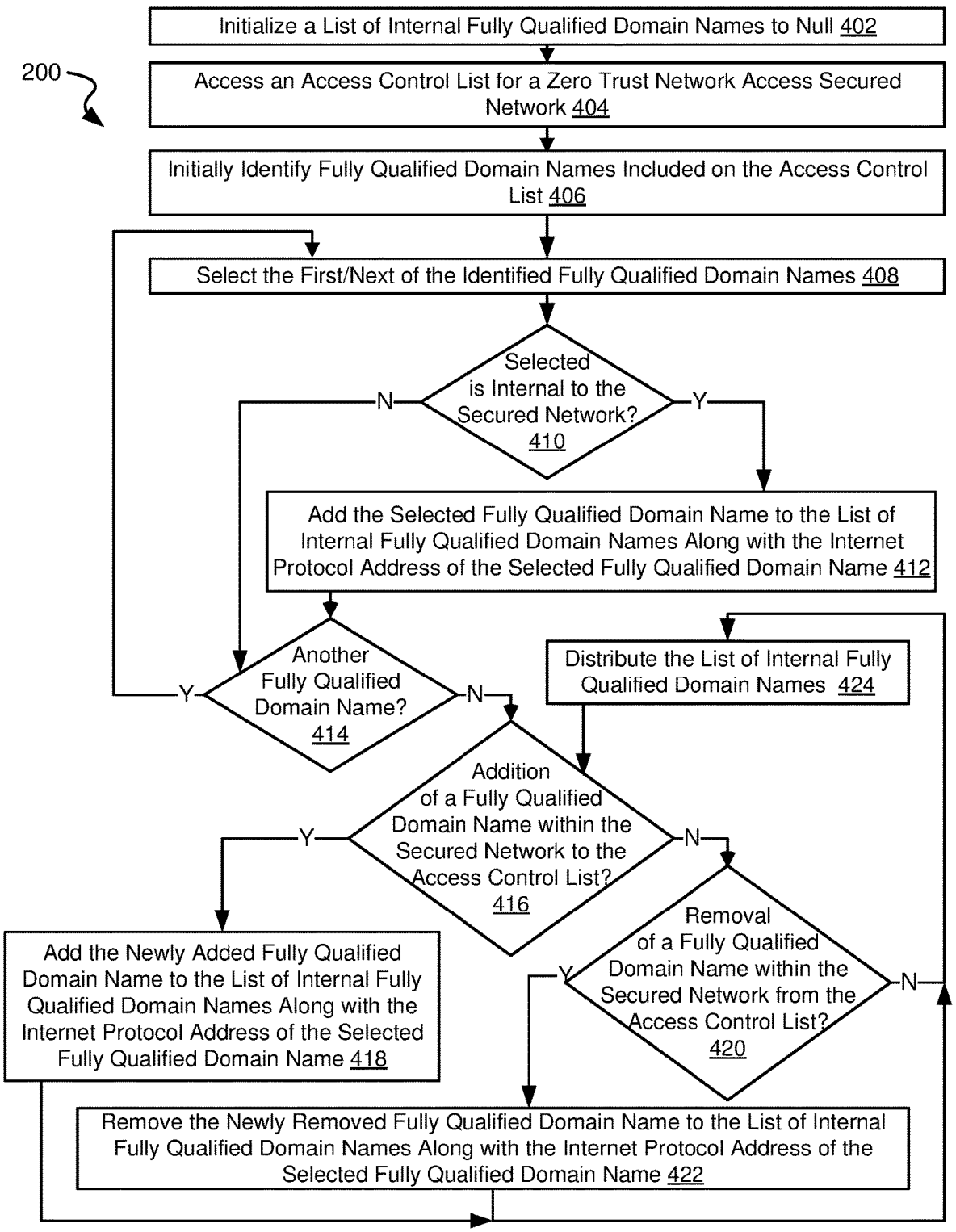
FIG. 4 is a flow diagram showing a method in accordance with various embodiments for generating and maintaining a list of fully qualified domain names of resources based upon an access control list of for a ZTNA network.

Turning to FIG. 4, a flow diagram 400 shows a method in accordance with various embodiments for generating and maintaining a list of fully qualified domain names of network resources based upon an access control list of for a ZTNA network. Following flow diagram 400, a list of internally fully qualified domain names is initialized as null (block 402). As more fully described in relation to FIG. 3 above, this list is used for resolving domain names without requiring activity beyond the secured network for one or more network resources available within the secured network.

An access control list maintained for a ZTNA secured network is accessed (block 404). Such an access control list includes network resources that are identifiable as permitted to the secured network, and includes network resources within the secured network. As different devices and/or applications, both virtual and physical, become permitted on the secured network, the access control list is updated. Use of and maintenance of an access control list in relation to a ZNA secured network is known in the art, and the updating of the access control list may be fully automated, may be fully manual where a network administrator oversees entries in the access control list, or may be some combination of automatic and manual depending upon the particular implementation. Based upon the disclosure provided herein, one of ordinary skill in the art will recognize a variety of approaches for using and maintaining an access control list in relation to different embodiments.

The access control list is queried to identify any fully qualified domain names that have been identified as permitted on the secured network (block 406). In identifying the fully qualified domain names that are registered with the EMS (block 206), the IP address corresponding to each of the respective fully qualified domain names is determined. Such determination of the IP addresses may be done using any approach known in the art. One of the identified fully qualified domain names is selected (block 408), and it is determined whether the selected fully qualified domain name corresponds to a resource within the secured network (block 410). This determination may be made, for example, by querying the EMS of the secured network to see if the resource is registered on the secured network. Where it is found that the fully qualified domain name corresponds to a resource within the secured network (block 410), the selected fully qualified domain name is added to the list of internal fully qualified domain names along with the IP address(es) that correspond to each of the respective domain names (block 412).

It is then determined whether there is another identified fully qualified domain name (block 414). Where there is another (block 414), the processes of blocks 408-414 are repeated. Once all of the fully qualified domain names have been processed (block 414), the initial setup of the list of internal fully qualified domain names is completed, and the list can be distributed to endpoint security applications associated with endpoint devices.

Changes in the access control list are monitored to determine a change in network resources within the secured network that should be reflected in the list of internal fully qualified domain names. In particular, where it is determined that a fully qualified domain name corresponding to a resource within the secured network has been added to the access control list (block 416), the newly added fully qualified domain name and corresponding IP address are added to the list of internal fully qualified domain names (block 418). Similarly, that a fully qualified domain name corresponding to a resource within the secured network has been removed from the access control list (block 206), the newly removed fully qualified domain name and corresponding IP address are removed from the list of internal fully qualified domain names (block 422). Each time the list of internal fully qualified domain names is changed (block 418, 422), the updated list is distributed to endpoint security applications associated with endpoint devices (block 424).

In conclusion, the present invention provides for novel systems, devices, and methods. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for reducing internal network information available outside of a secured network, the method comprising:
   receiving, by a processing resource, a request for a requested network resource, wherein the request for the network resource includes a domain name corresponding to the requested network resource;
   accessing, by the processing resource, an internal list of domain names, wherein the internal list of domain names includes at least one domain name and a corresponding internet protocol address used to access a network resource identified by the domain name, and wherein the network resource identified by the domain name is accessible within the secured network;
   determining, by the processing resource, that the requested network resource is included in the internal list of domain names; and
   based at least in part on determining that the requested network resource is included in the internal list of domain names, providing, by the processing resource, an internet protocol address from the internal list of domain names in response to the request for the requested network resource without accessing a domain name system external to the secured network, wherein the request is received from an endpoint device, wherein providing the internet protocol address from the internal list of domain names includes: providing the internet protocol address from the internal list of domain names for use by the endpoint device, and
   wherein providing the internet protocol address from the internal list of domain names for use by the endpoint device includes providing the internet protocol address in a message format used by a domain name system external to the secured network.

2. The method of claim 1, wherein the request is a first request, wherein the requested network resource is a first requested resource, and wherein the domain name is a first domain name, the method further comprising:
   receiving, by the processing resource, a second request for a second requested network resource, wherein the second request for the second network resource includes a second domain name corresponding to the second requested network resource;
   determining, by the processing resource, that the second requested network resource is absent from the internal list of domain names; and
   based at least in part on determining that the second requested network resource is absent from the internal list of domain names, forwarding, by the processing resource, a domain name server request for the second domain name to domain server outside of the secured network.

3. The method of claim 2, the method further comprising:
   receiving, by the processing resource, an internet protocol address corresponding to the second domain name from the domain server.

4. The method of claim 3, the method further comprising:
   providing the internet protocol address corresponding to the second domain name received from the domain server.

5. The method of claim 4, the method further comprising:
   wherein the request is received from an endpoint device; and
   wherein providing the internet protocol address corresponding to the second domain name includes: providing the internet protocol address corresponding to the second domain name for use by the endpoint device.

6. The method of claim 1, the method further comprising:
   receiving, by the processing resource, the internal list of domain names from a network resource within the secured network.

7. A system for reducing internal network information available outside of a secured network, the system comprising:
   a processing resource;
   a non-transitory computer-readable medium, coupled to the processing resource, having stored therein instructions that when executed by the processing resource cause the processing resource to:
      receive a request for a requested network resource, wherein the request for the network resource includes a domain name corresponding to the requested network resource;
      access an internal list of domain names, wherein the internal list of domain names includes at least one domain name and a corresponding internet protocol address used to access a network resource identified by the domain name, and wherein the network resource identified by the domain name is accessible within the secured network;

determine that the requested network resource is included in the internal list of domain names; and based at least in part on determining that the requested network resource is included in the internal list of domain names, provide an internet protocol address from the internal list of domain names in response to the request for the requested network resource without accessing a domain name system external to the secured network, wherein the request is received from an endpoint device, wherein providing the internet protocol address from the internal list of domain names includes: providing the internet protocol address from the internal list of domain names for use by the endpoint device, and wherein providing the internet protocol address from the internal list of domain names for use by the endpoint device includes providing the internet protocol address in a message format used by a domain name system external to the secured network.

8. The system of claim 7, wherein the request is a first request, wherein the requested network resource is a first requested resource, and wherein the domain name is a first domain name, and wherein the instructions that when executed by the processing resource further cause the processing resource to:

receive a second request for a second requested network resource, wherein the second request for the second network resource includes a second domain name corresponding to the second requested network resource;

determine that the second requested network resource is absent from the internal list of domain names; and based at least in part on determining that the second requested network resource is absent from the internal list of domain names, forward a domain name server request for the second domain name to domain server outside of the secured network.

9. The system of claim 8, wherein the instructions that when executed by the processing resource further cause the processing resource to:

receive an internet protocol address corresponding to the second domain name from the domain server.

10. The system of claim 9, wherein the instructions that when executed by the processing resource further cause the processing resource to:

provide the internet protocol address corresponding to the second domain name received from the domain server.

11. The system of claim 7, wherein the instructions that when executed by the processing resource further cause the processing resource to:

receive the internal list of domain names from a network resource within the secured network.

12. A non-transitory computer-readable storage medium embodying a set of instructions, which when executed by a processing resource, causes the processing resource to:

receive a request for a requested network resource, wherein the request for the network resource includes a domain name corresponding to the requested network resource;

access an internal list of domain names, wherein the internal list of domain names includes at least one domain name and a corresponding internet protocol address used to access a network resource identified by the domain name, and wherein the network resource identified by the domain name is accessible within the secured network;

determine that the requested network resource is included in the internal list of domain names; and based at least in part on determining that the requested network resource is included in the internal list of domain names, provide an internet protocol address from the internal list of domain names in response to the request for the requested network resource without accessing a domain name system external to the secured network, wherein the request is received from an endpoint device, wherein providing the internet protocol address from the internal list of domain names includes: providing the internet protocol address from the internal list of domain names for use by the endpoint device, and wherein providing the internet protocol address from the internal list of domain names for use by the endpoint device includes providing the internet protocol address in a message format used by a domain name system external to the secured network.

* * * * *